(12) United States Patent
Doerr

(10) Patent No.: US 7,724,991 B1
(45) Date of Patent: May 25, 2010

(54) COMPACT OPTICAL RECEIVER

(75) Inventor: Christopher Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/363,734

(22) Filed: Jan. 31, 2009

(51) Int. Cl.
*G02B 6/12* (2006.01)
(52) U.S. Cl. ........................................... 385/14
(58) Field of Classification Search ............... None
See application file for complete search history.

(56) References Cited

U.S. PATENT DOCUMENTS

| | | | |
|---|---|---|---|
| 5,488,680 A * | 1/1996 | Dragone | 385/24 |
| 2007/0166048 A1 * | 7/2007 | Doerr et al. | 398/158 |
| 2007/0216988 A1 * | 9/2007 | Caplan | 359/325 |

* cited by examiner

*Primary Examiner*—Sung H Pak
(74) *Attorney, Agent, or Firm*—Brosemer, Kolefas & Associates

(57) ABSTRACT

A compact optical receiver exhibiting polarization-diversity and employing an arrayed-waveguide-grating (AWG).

13 Claims, 8 Drawing Sheets

US 7,724,991 B1

COMPACT OPTICAL RECEIVER

FIELD OF THE INVENTION

This invention relates generally to the field of optical communications and in particular to a compact, multi-channel polarization-diversity optical coherent receiver.

BACKGROUND OF THE INVENTION

Coherent detection of optical signals is a technique known to improve the spectral efficiency of fiber-optic transmission. [See, e.g., F. Derr, "Coherent Optical QPSK Intradyne System Concept and Digital Receiver Realization," J.Lightwave Technol., vol. 10, pp. 1290-1296, September 1992; Y. Han and G. Li, "Coherent Optical Communication Using Polarization Multiple-Input-Multiple-Output," Optics Express, vol. 12, pp. 7527-7534, 2005; A. Leven, N. Kaneda, V. V. Koc, and Y. K. Chen, "Coherent Receivers for Practical Optical Communication Systems," Optical Fiber Communication Conference, OThK4, 2007; R. Nagarajan, et. al., "Large-Scale Photonic Integrated Circuits," J.Sel.Top.Quant. Electron., vol. 11, pp. 50-65, January-February 2005; H. Takeuchi, et. al., "Monolithic Integrated Coherent Receiver on InP Substrate," IEEE Photon.Technol.Lett., vol. 1, pp. 398-400, November 1989; T. L. Koch et. al., "GaInAs/GaInAsP Multiple-Quantum-Well Integrated Heterodyne Receiver," Electron Lett., vol. 25, pp. 1621-1623, November 1989; and R. J. Deri et. al., "Ultracompact Monolithic Integration of Balanced, Polarization Diversity Photodetectors for Coherent Lightwave Receivers," IEEE Photon Technol. Lett., vol 4., pp. 1238-1240, November 1992]. This technique allows the detection of information encoded in optical magnitude, phase, and polarization and—when combined with wavelength-division multiplexing (WDM)—facilitates large, information-carrying capacity in a single optical fiber.

Unfortunately contemporary receivers employing coherent detection typically require numerous components and consequently are both complex and costly.

SUMMARY OF THE INVENTION

An advance is made in the art according to the principles of the present invention directed to a compact optical receiver exhibiting polarization-diversity. In sharp contrast to the prior art which has demonstrated a monolithic-single-quadrature coherent receiver, the present invention is a dual-quadrature device which advantageously eliminates the need for separate 1×2 couplers for each quadrature.

BRIEF DESCRIPTION OF THE DRAWING

A more complete understanding of the present invention may be realized by reference to the accompanying drawings in which:

FIG. 5 is a series of graphs showing measured passbands from the LO port of the device shown in FIG. 1 to each of the photodetectors for TE and TM polarizations, measured by tuning a laser and measuring the photocurrent wherein FIG. 5(a) and FIG. 5(b) depict those signals traversing the upper and lower Arrayed Waveguide Gratings, respectively.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
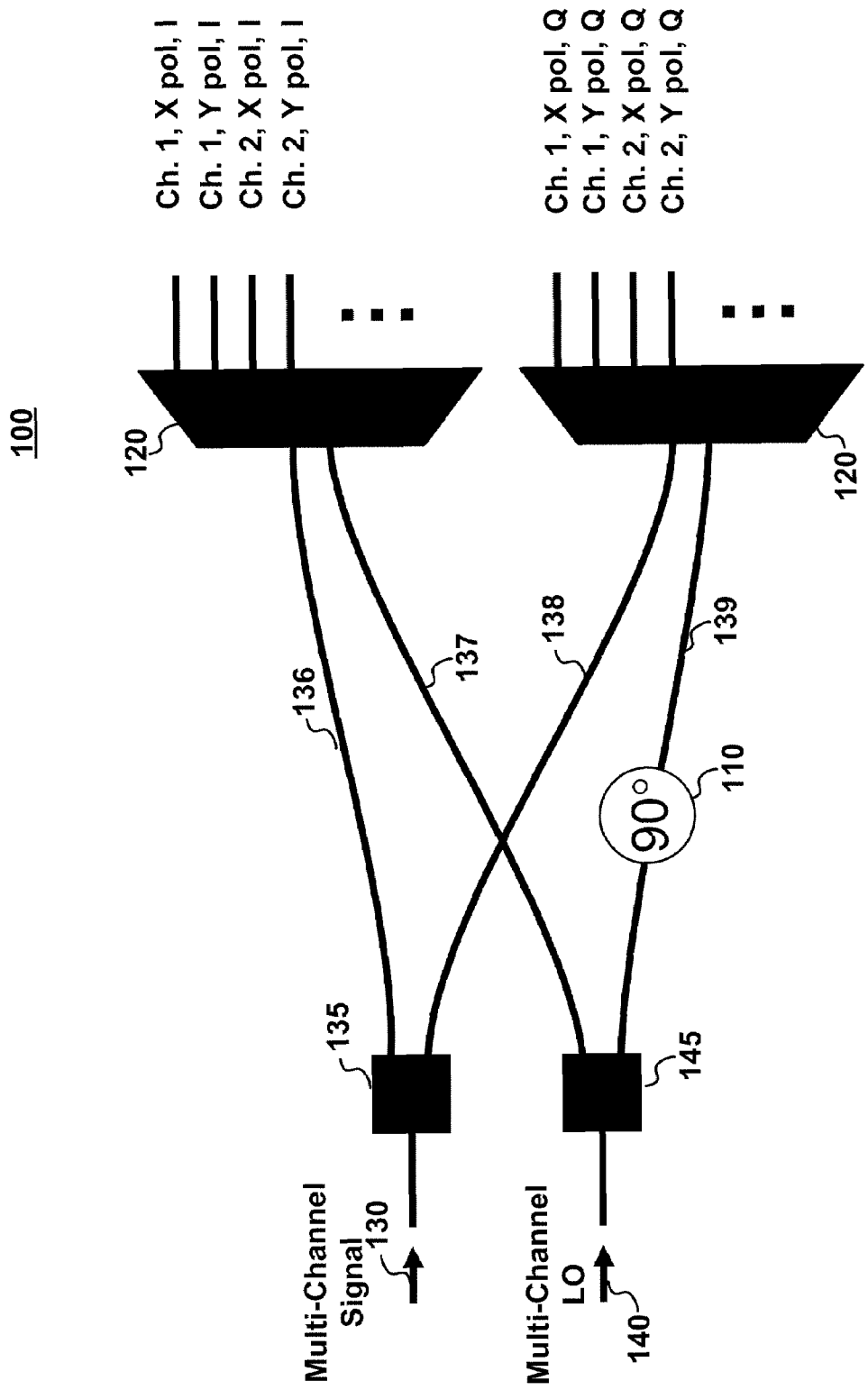
FIG. 1 is a schematic diagram of a multichannel coherent receiver according to an aspect of the present invention.

Turning now to FIG. 1 there is shown a schematic of a multichannel coherent receiver 100 according to an aspect of the present invention. The receiver 100 generally comprises a 90-degree phase-shifting hybrid 110, two arrayed-waveguide grating demultiplexers 120 (AWGs), and a number of photodetectors (not specifically shown in this FIG. 1). As can be appreciated by those skilled in the art, the actual number of channels supported and corresponding photodetectors used is a matter of design choice. In a representative, five-channel configuration such as that shown however, there are preferably 20 photodetectors.

At this point it is worth noting that AWGs such as those shown in FIG. 1 are well known in the art and have found a variety of applications in the optical arts. Commonly known as "frequency routing devices" such structures operate as both a multiplexer and demultiplexer of optical frequencies and are described in more detail in U.S. Pat. No. 5,488,680 which issued to Dragone on Jan. 30, 1996, the entire contents of which are hereby incorporated by reference.

Operationally, multiple signal channels 130 enter a 1×2 coupler 135 (the upper coupler) where they are split and directed to an input positioned on the edge of the central diffraction zone of each of the two AWGs 120. Similarly, multiple local oscillator (LOs) signals 140 enter another 1×2 coupler 145 (the lower coupler) where they are split and directed to an input on the other edge of the central diffraction zone of each of the two AWGs 120. As shown in FIG. 1, one set of the LO signals split by coupler 145 are phase shifted 90° through the effect of a 90-degree phase shifter 110 positioned in the optical path between the coupler 145 and one of the two AWGs 120. Those skilled in the art will understand that the phase shifter 110 shown individually in this FIG. 1 may advantageously be implemented by an optical path equal to a quarter-wavelength. Additionally, while the phase shifter may be thought of as a single 90-degree phase shifter, it may be desirable to make it adjustable, as convenient.

While not explicitly shown in FIG. 1 the optical path length from the upper 1×2 coupler 135 to the upper AWG is substantially equal to the optical path length from the lower 1×2 coupler 145 to the upper AWG. Accordingly, the length of waveguide 136 is substantially equal to the length of waveguide 137.

Likewise, the optical path length from the upper 1×2 coupler 135 to the lower AWG is substantially equal to the optical path length from the lower 1×2 coupler 145 to the lower AWG plus one-quarter wavelength. Accordingly the length of waveguide 138 is substantially equal to the length of waveguide 139, plus the length of a one-quarter (¼) wavelength.

The two inputs to each AWG are spaced apart by a distance equal to one diffraction zone length. Consequently, light entering the AWGs from those inputs interfere at the grating arms. As a result, this configuration effectively acts as a 2×1 coupler—advantageously eliminating such a separate component in the overall configuration.

As can now be understood, the interference pattern produced when the two inputs are in phase has dips between the grating waveguide inlets, increasing the AWG efficiency—especially for an AWG made from high-index-contrast waveguides. As a result, when high-index contrast waveguides are used—as is frequently the case in the fabrication of semiconductor photonic integrated circuits—the improvement in insertion loss may approach 3 dB. Furthermore, by not employing a separate 2×1 coupler, an additional ~1 dB improvement is realized in high-index-contrast waveguides. Consequently, this representative structure according to an aspect of the present invention improves existing designs by ~4 dB in insertion loss.

Operationally, multi-channel signals 130 and multi-channel local oscillator signals (LO) 140 are introduced into and demultiplexed by the AWGs 130. As shown in this FIG. 1, the upper AWG emits in-phase components (I) for each of the channels and polarizations while the lower AWG emits quadrature (Q) components thereof.

Advantageously, polarization-dependent wavelength shift (PDWS) of Indium Phosphide (InP) waveguides may be engineered to be very large. In the representative embodiment shown, they can be on the order of 4 nm. Consequently, by choosing a channel spacing of ~8 nm (1000 GHz) and having twice as many output waveguides as channels per AWG, the AWG will serve both as a demultiplexer and polarization splitter without requiring any special fabrication steps.

As can be appreciated, the large channel spacing of a photonic integrated circuit (PIC) such as this does not preclude dense wavelength division multiplexing (WDM) as one may employ de-interleavers prior to the PIC thereby permitting the PIC to go from say 50-GHz channel spacing to 1000-GHz channel spacing, for example. Of course, these ranges are used only as examples and the actual channel spacing(s) employed may be any of a number required as circumstances change.

While not specifically shown in FIG. 1, each AWG output is directed to a respective photodetector. As shown in FIG. 1 however, the outputs are arranged to be in pairs of I and Q for each channel and polarization such that center channels—which exhibit the lowest AWG loss—travel the furthest before reaching its respective photodetector.

Figure 2A:
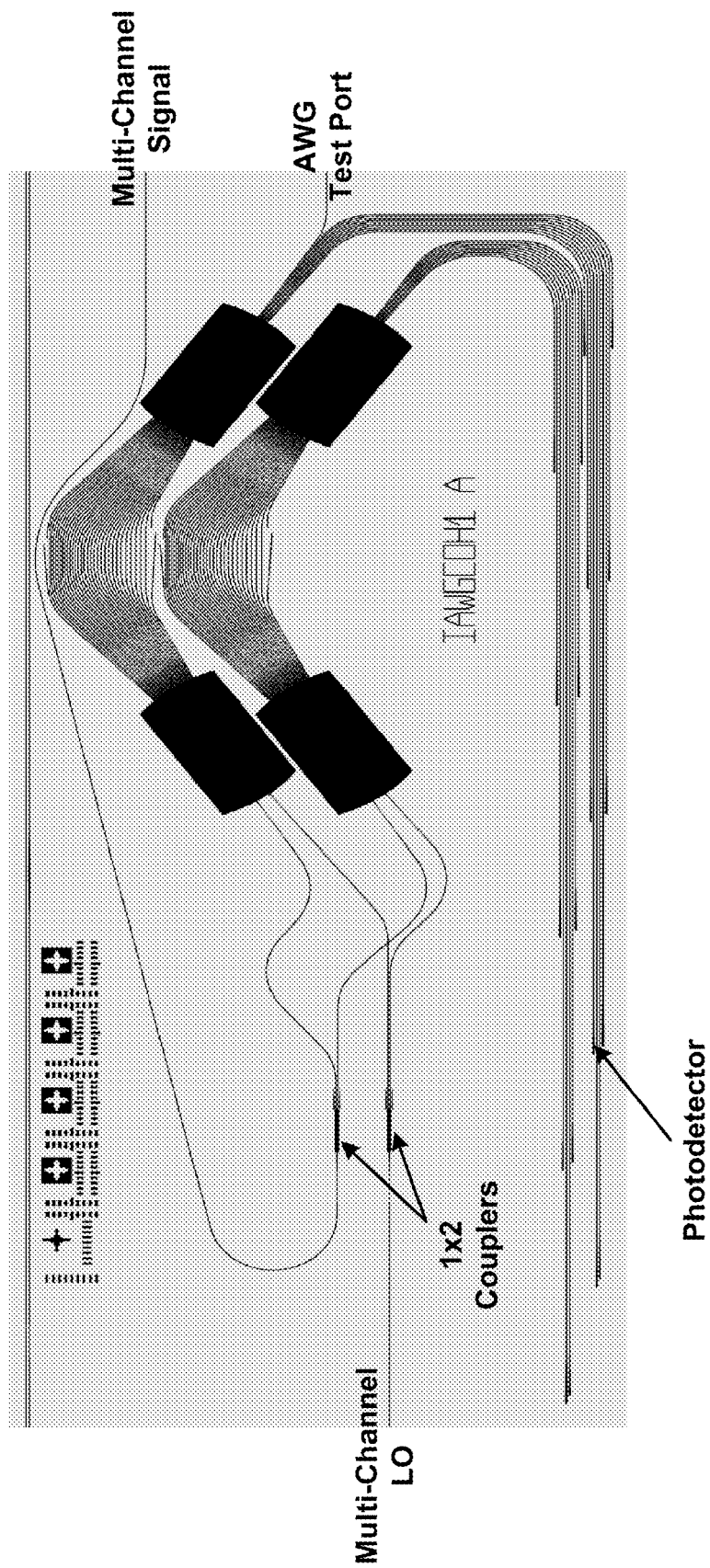
FIG. 2(a) is a schematic diagram showing the waveguide layout for a receiver according to an aspect of the present invention.
Figure 2B:
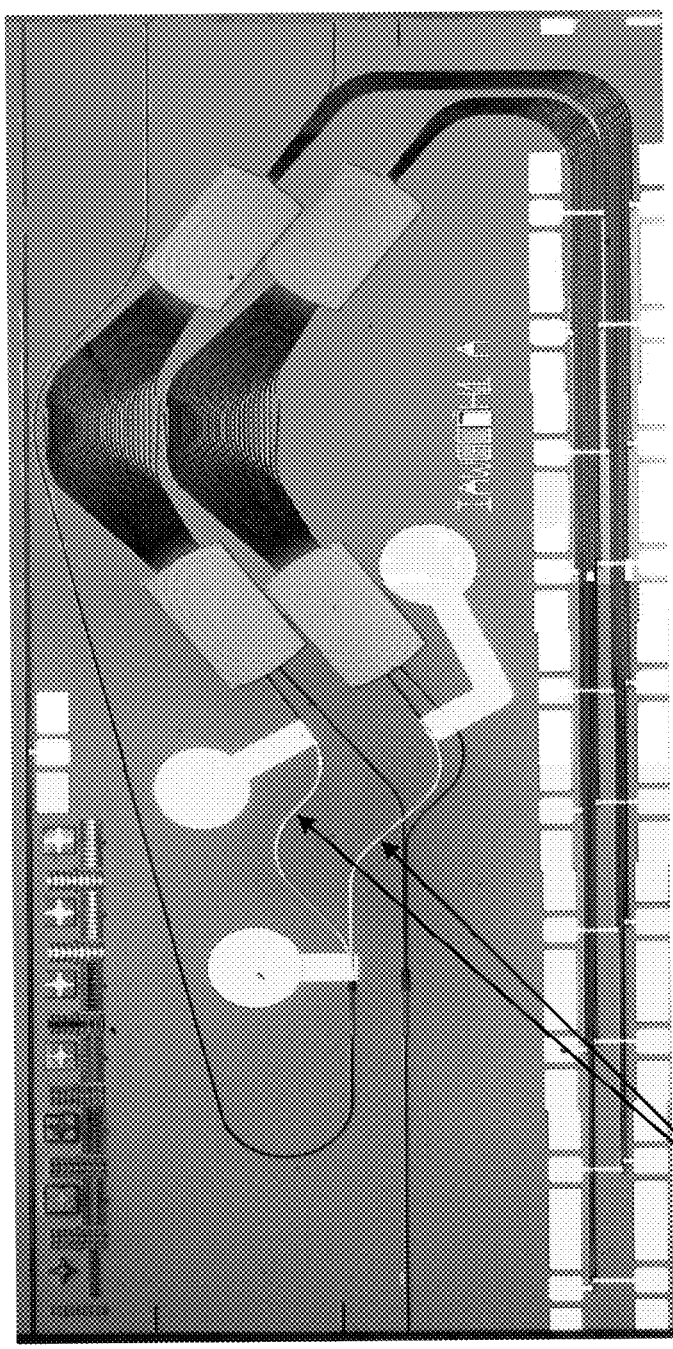
FIG. 2(b) is a photomicrograph of the receiver according to an aspect of the present invention.

With simultaneous reference now to FIG. 2(*a*) and FIG. 2(*b*), there is shown a representative waveguide layout and photograph of a PIC—according to an aspect of the present invention. Shown in FIG. 2(*a*) are inputs for the multi-channel signals and local oscillator signals which are directed to respective 1×2 couplers prior to subsequent distribution to the pair of AWGs. For testing purposes, an AWG test port is shown which is optional to the device construction. Finally, a series of photodetectors are positioned at the outputs of the AWGs, while phase shifters, e.g., thermoptic phase shifters, are positioned at the inputs to the AWGs. In an exemplary embodiment such as that shown, the AWGs each have 30 grating arms each, with a grating order of 25.5. The photodetectors are 3.2 microns×25 microns, although those skilled in the art will appreciate that other configurations/sizes are possible.

Figure 3A:
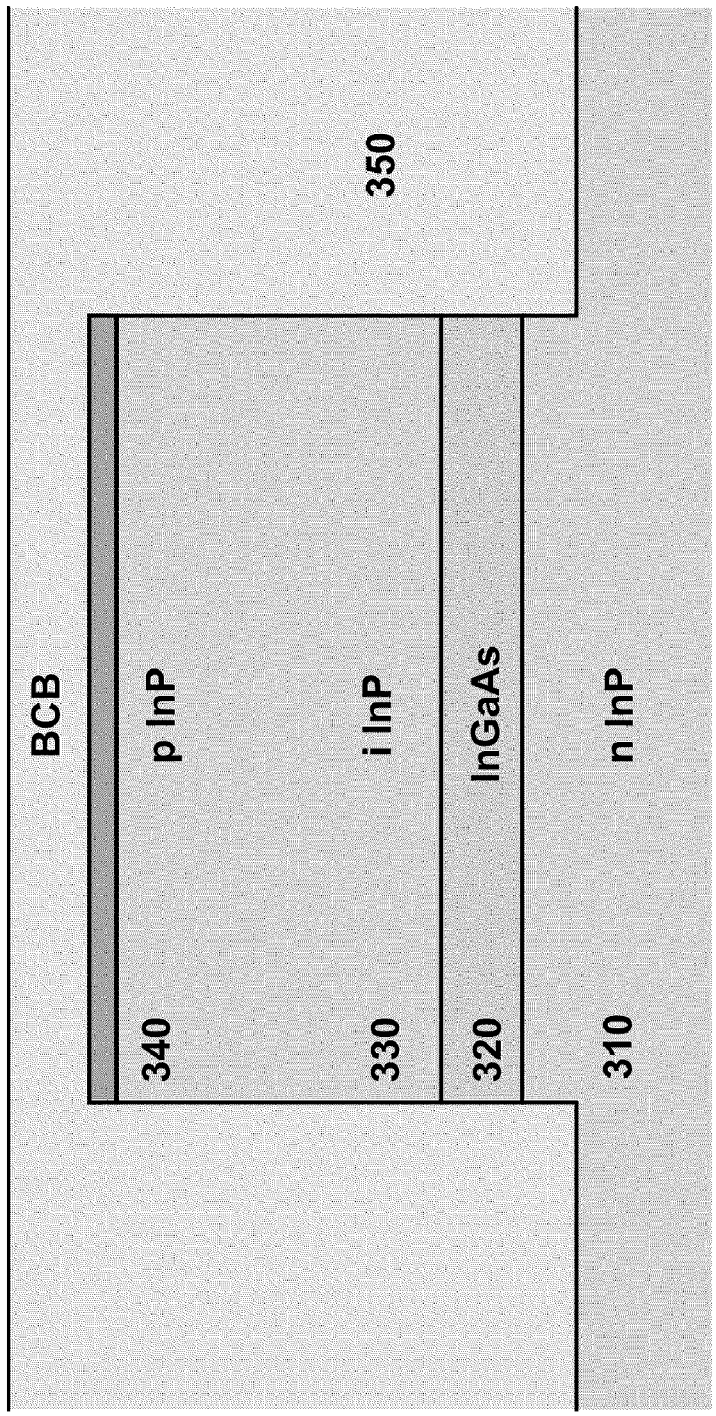
FIG. 3 is a cross-sectional schematic diagram of a passive waveguide (FIG. 3(a)) and photodetector (FIG. 3(b)) according to an aspect of the present invention.
Figure 3B:
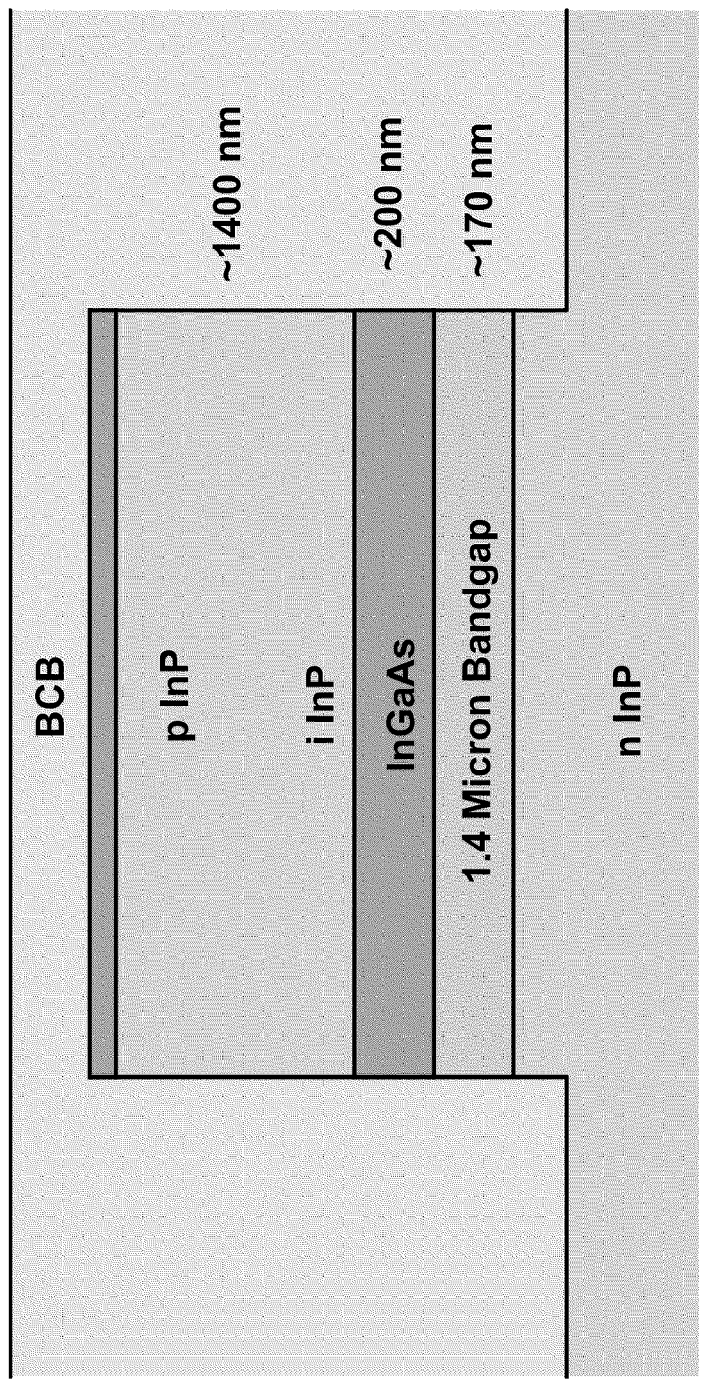

Turning now to FIG. 3, there it may be seen the cross-sectional structures for both the waveguides (FIG. 3*a*) and the photodiodes (FIG. 3*b*). With initial reference to FIG. 3*a*, there is shown a structure for passive waveguides as may be employed according to aspects of the present invention. In particular, onto an n-doped InP substrate 310 are grown an InGaAs P core layer 320, an i-InP layer 330 and a p-InP layer 340. Overlying the entire structure, is a quantity of benzocyclobutene (BCB) 350 which is spun onto the structure. In this exemplary embodiment, none of the layers are intentionally doped—with the exception of the p-doped InP ternary layer 340.

The fabrication of the structure is readily understood by those skilled in the art. In particular, after the layers are grown on the InP substrate, detector regions (see, e.g., FIG. 2*a* and FIG. 3*b*) are protected and the ternary layer is etched away. While keeping glass covering on the photodetector regions ~200 nm of undoped InP is grown. The glass covering is removed and ~1.3 μm of a gradually-increasing p-doped InP region is grown.

The waveguides are then patterned and etched to a depth of ~2.1 μm and benzocyclobutene is applied. The BCB is etched away such that n-contacts on the substrate are exposed. Metal for thermooptic heaters is deposited and lifted off. Finally, BCB is etched from the areas over the photodetectors for p-contacts, and the contact metal is deposited and lifted.

Measured waveguide loss for exemplary devices was measured to be ~1.4 dB/mm, with a low, polarization-dependent loss. This high loss is due—in part—to too-high p-doping levels near the waveguide(s). Measured waveguide without p-doping was only 0.55 dB/mm.

Figure 4:
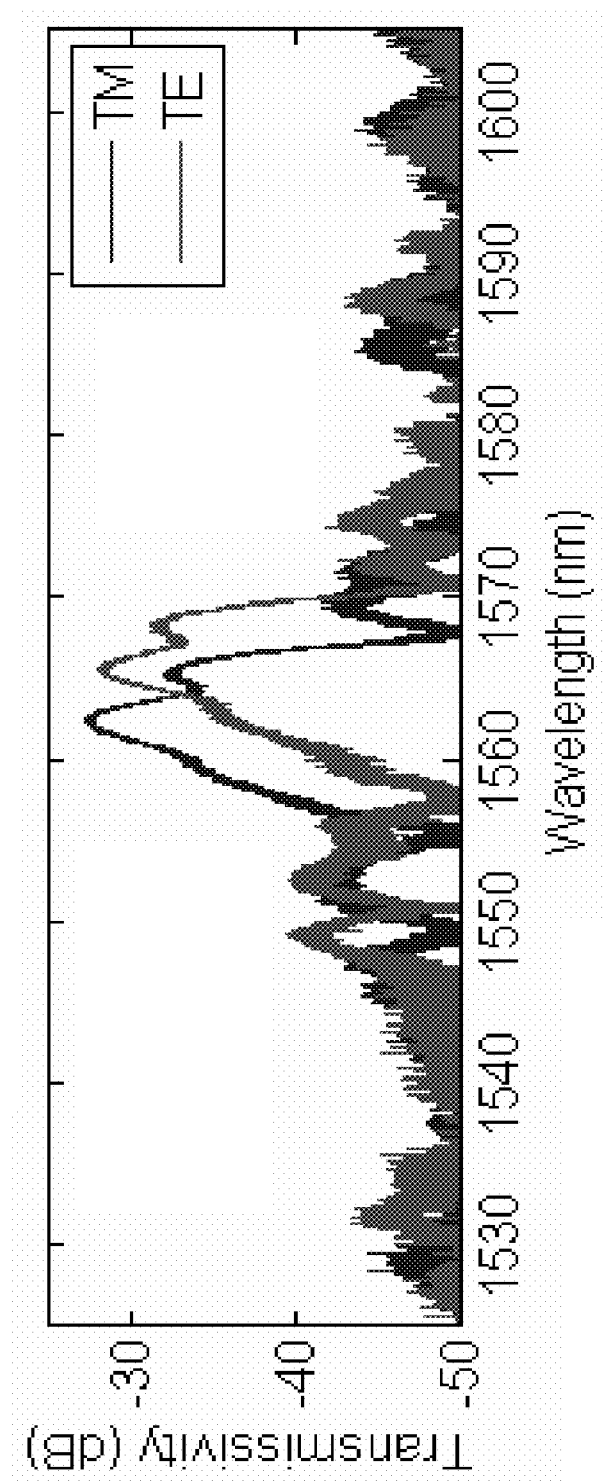
FIG. 4 is a graph showing the measured fiber-to-fiber transmissivity of the upper AWG from the LO port to the AWG test port for TE and TM polarizations for the device shown in FIG. 2(b)
Figure 5:
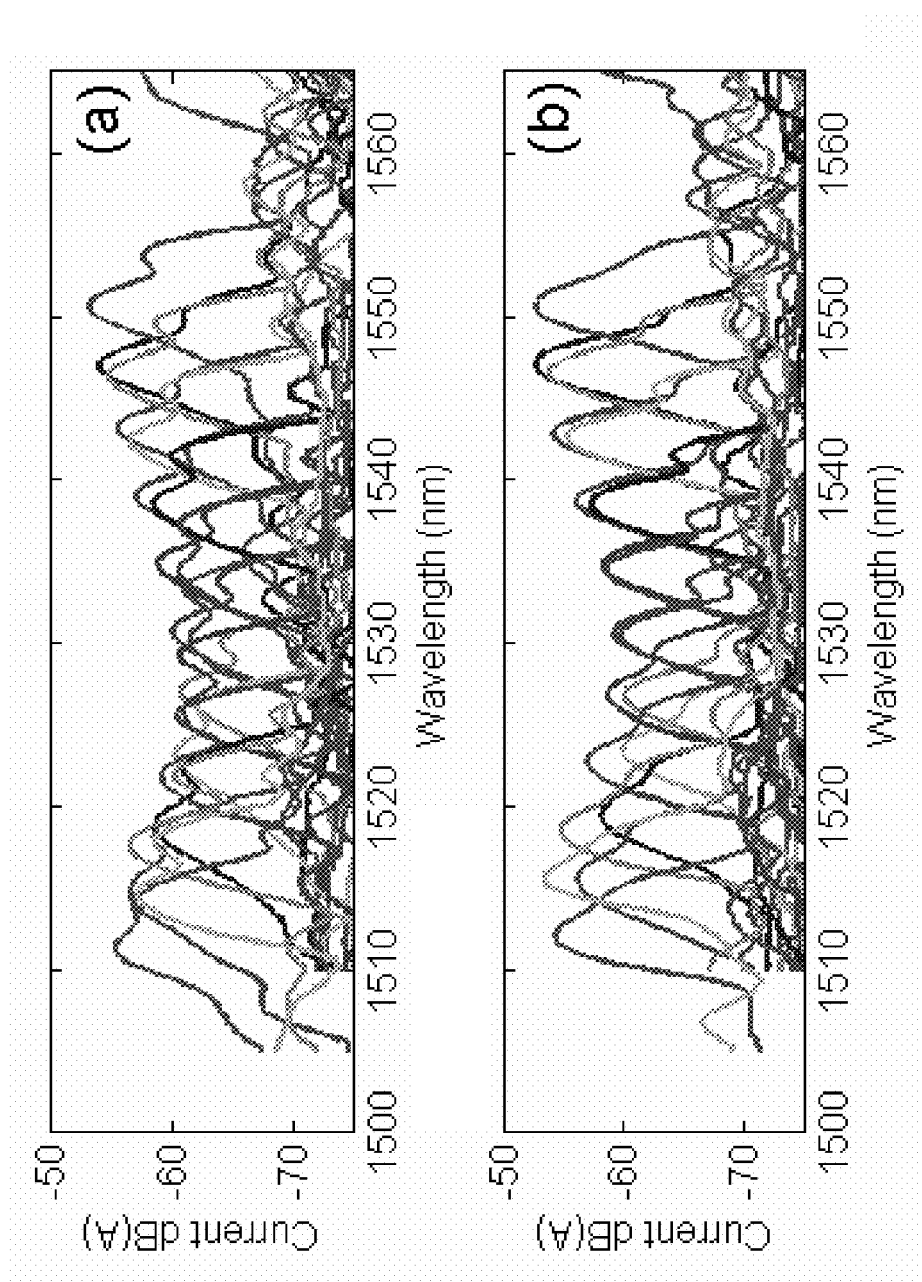

FIG. 4 shows the measured fiber-to-fiber transmissivity of the upper AWG from the LO port to the AWG test port for transverse electric (TE) and transverse magnetic (TM) polarizations. FIG. 5 shows measured passbands from the LO port to each of the photodetectors for TE and TM polarizations (total of 40 traces), measured by tuning a laser and measuring the photocurrent. FIG. 5*a* and FIG. 5*b* represent signals that went through the upper and lower AWGs, respectively.

The measurements were obtained by sweeping a tunable laser into the LO port and measuring each PD photocurrent. The measured PDWS is ~3.5 nm slightly off from the desired 4.0 nm. This appears to be due—in part—to the quaternary layer having a lower bandgap wavelength than optimal. As one may observe from FIG. 5, the loss is higher for the central channels, which may be due to high propagation loss in the output waveguides. As may be further observed, some of the sidelobes are high. Despite these characteristics however, the device is able to clearly detect a 10-Gb/s non-return-to-zero signal, and is estimated to have a bandwidth of ~35 GHz.

In the experimental structures, the actual center wavelength of the AWGs was off by ~10 nm from that designed and as a result only four of the five channels were located in the C band. Experimentally, a 10.7-Gbaud quadrature phase-shift keyed (QPSK) signal was launched into the signal port and a separate CW signal at nominally the same wavelength was launched into the LO port. The QPSK signal was generated by a laser introduced into the $LiNbO_3$ modulator driven by two relative-delayed pseudo-random bit sequences.

Figure 6:
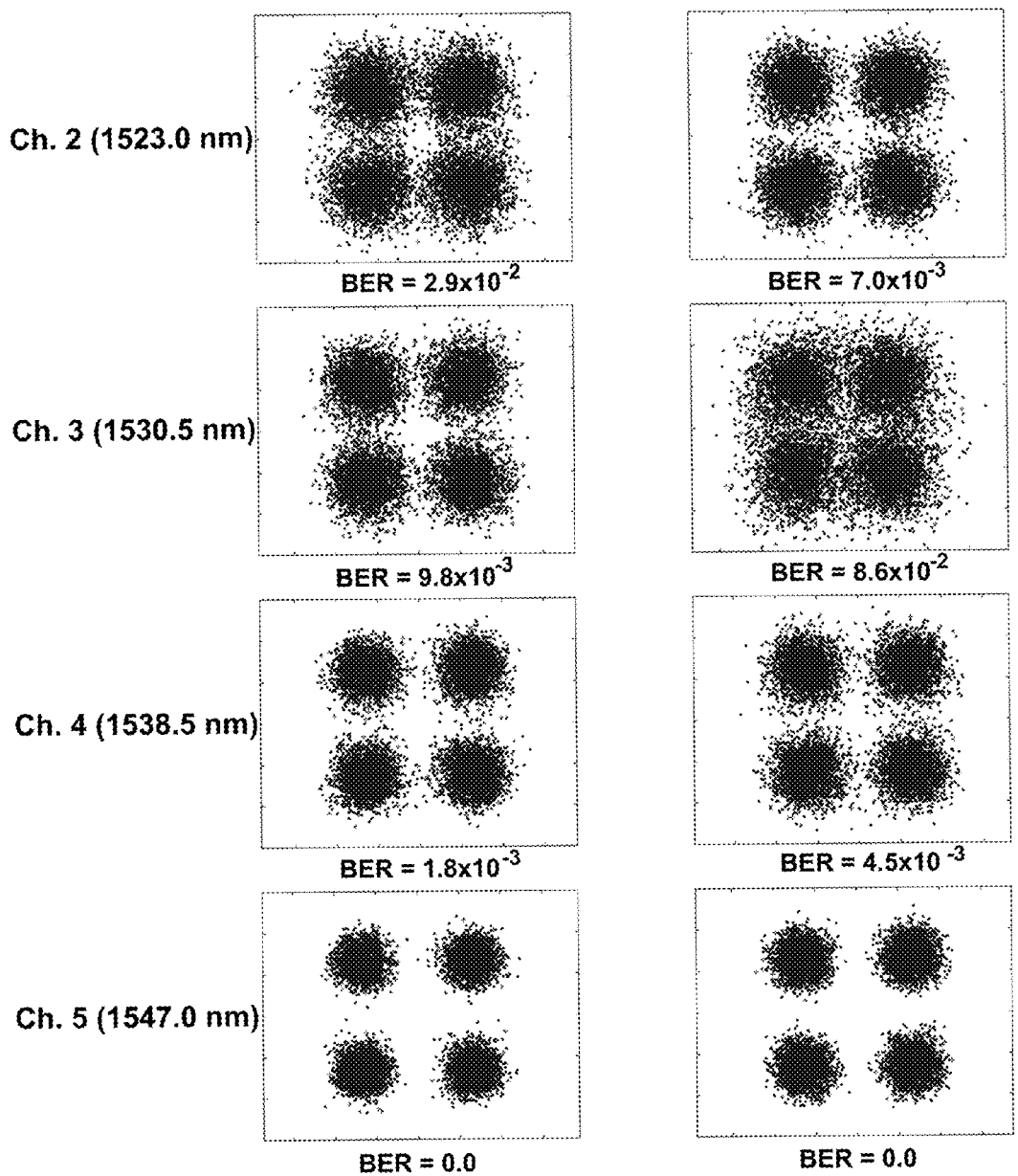
FIG. 6 shows a series of IQ constellations at four different wavelength channels and polarizations and their associated Bit Error Rate(s) (BERs).

Both signal and LO lasers were external cavity lasers. The lasers were tuned to four different wavelengths—one at a time—and the polarizations was adjusted to either transverse electric (TE) or transverse magnetic (TM) to measure the four channels in the X and Y polarizations. In the fiber, the LO and signal launch powers were +16 and +16 dBm, respectively. Two ground-signal probes were connected to the I and Q photodiodes for each channel and polarization. The measured constellations are shown in FIG. 6.

At this point, while we have discussed and described the invention using some specific examples, those skilled in the art will recognize that our teachings are not so limited. Accordingly, the invention should be only limited by the scope of the claims attached hereto.

The invention claimed is:

1. An apparatus for the coherent reception of a multi-wavelength optical signal, said apparatus comprising:
    an arrayed waveguide grating (AWG) having at least two inputs;
    wherein at least a portion of the multi-wavelength optical signal is applied to one of the inputs and at least a portion of a local oscillator signal is applied to the other one of the inputs wherein the two inputs to the AWG are spaced apart by a distance substantially equal to one diffraction zone.

2. The apparatus of claim 1 further comprising:
    a second arrayed waveguide grating (AWG) having at least two inputs;
    wherein at least a portion of the multi-wavelength optical signal is applied to one of the inputs of the second AWG and at least a portion of a local oscillator signal is applied to the other one of the inputs of the second AWG wherein the two inputs to the second AWG are spaced apart by a distance substantially equal to one diffraction zone.

3. The apparatus of claim 2 further comprising a plurality of photodetectors for detecting optical signals output from at least one of the AWGs.

4. The apparatus of claim 3 wherein in-phase components of the multi-channel optical signal are output from one of the two AWGs while quadrature components of the multi-channel optical signal are output from the other one of the two AWGs.

5. An optical apparatus comprising:
    a first arrayed waveguide grating (AWG) having at least two input ports and a plurality of output ports;
    a second arrayed waveguide grating (AWG) having at least two input ports and a plurality of output ports;
    a first optical coupler having an input port and at least two output ports;
    a second optical coupler having an input port and at least two output ports;
    a first waveguide optically connecting one of the output ports of the first optical coupler to an input of the first AWG;
    a second waveguide optically connecting another output port of the first optical coupler to an input of the second AWG;
    a third waveguide optically connecting one of the output ports of the second optical coupler to an input of the first AWG;
    a fourth waveguide optically connecting another output port of the first optical coupler to an input of the second AWG;
    wherein the two inputs to each AWG are spaced apart by a distance substantially equal to one diffraction zone.

6. The optical apparatus of claim 5 wherein said first waveguide is substantially equal in length to said third waveguide.

7. The optical apparatus of claim 6 wherein said second waveguide is substantially equal in length to said fourth waveguide±¼ wavelength.

8. The optical apparatus of claim 5 further comprising an adjustable degree phase shifter interposed in the optical path defined by one of the two waveguides optically connecting one of the 1×2 couplers to one of the AWGs.

9. The optical apparatus of claim 5 further comprising a plurality of photodetectors for detecting optical signals output from one of the AWGs.

10. A method of receiving optical signals comprising the steps of:
    introducing a multi-channel optical signal and a multi-channel local oscillator signal into a pair of arrayed-waveguide grating (AWG) demultiplexers such that they are spaced apart in each AWG by a distance substantially equal to one diffraction zone; and
    detecting optical signals output from the pair of AWGs;
    wherein in-phase components of the multi-channel optical signal are output from one of the two AWGs while quadrature components of the multi-channel optical signal are output from the other one of the two AWGs.

11. The method of claim 10 further comprising the step of:
    splitting the multi-channel optical signal and the multi-channel local oscillator signals through the effect of a respective 1×2 splitter prior to introducing them to the pair of AWGs; and
    shifting the phase of one of the split multi-channel local oscillator signals prior to introduction to one of the AWGs.

12. The apparatus of claim 1 fabricated on an InP substrate.

13. The apparatus of claim 5 fabricated on an InP substrate.

* * * * *